J. KELSEY.
WHEEL HUB.
APPLICATION FILED DEC. 4, 1914.
1,309,804.
Patented July 15, 1919.
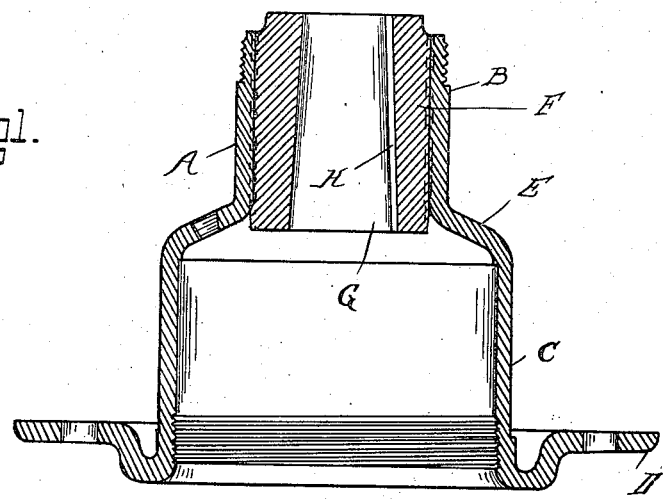
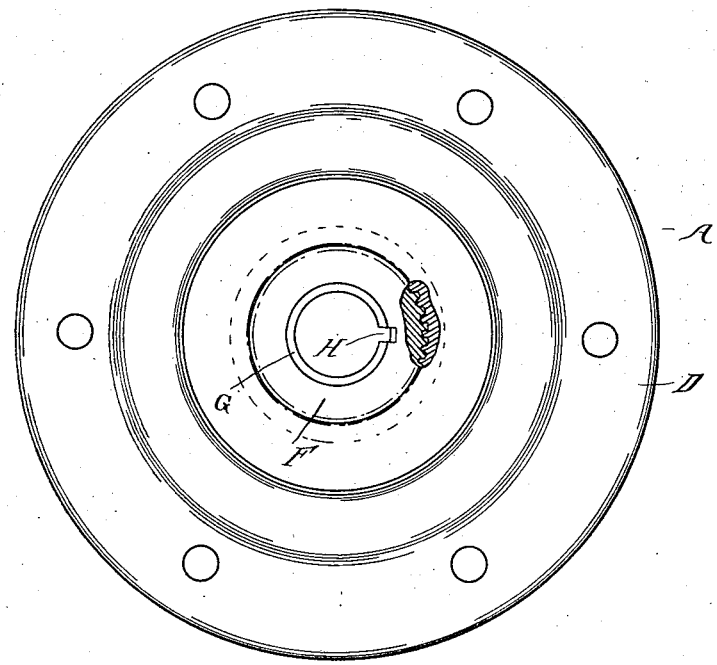
WITNESSES:
INVENTOR
John Kelsey
BY
Whittemore Hulbert + Whittemore
ATTORNEYS

UNITED STATES PATENT OFFICE.

JOHN KELSEY, OF DETROIT, MICHIGAN, ASSIGNOR TO KELSEY WHEEL COMPANY, INC., OF DETROIT, MICHIGAN, A CORPORATION OF NEW YORK.

WHEEL-HUB.

1,309,804.  Specification of Letters Patent.  Patented July 15, 1919.

Application filed December 4, 1914. Serial No. 875,506.

*To all whom it may concern:*

Be it known that I, JOHN KELSEY, a citizen of the United States of America, residing at Detroit, in the county of Wayne and State of Michigan, have invented certain new and useful Improvements in Wheel-Hubs, of which the following is a specification, reference being had therein to the accompanying drawings.

The invention relates to wheel hubs of that type provided with an enlarged recess for the reception of roller bearings. It is the object of the invention to obtain a construction which may be manufactured at low cost and which possesses all of the strength requisite for the work which is to be performed.

In the present state of the art hubs of this type are usually formed from forged blanks. These are necessarily formed of a shape which requires the removal of considerable stock by machining, with a result that the cost is increased, first, by the amount of metal required in the original blank; and second, by the labor of removing the surplus metal by machining. With my improved construction I have avoided this two-fold objection by first forming the hub from pressed sheet metal and by then reinforcing a portion of the sheet metal walls to produce the required thickness and strength. It is, however, necessary to so unite the sheet metal blank and its reinforcement as to transmit the torsional stresses from one to the other, and on account of the slight thickness of the sheet metal wall this becomes a difficult matter. I have therefore devised a construction in which the inner circumferential face of the sheet metal blank and the outer face of the reinforcing member are correspondingly serrated or broached, so that when engaged with each other a strong mechanical joint is formed without weakening the walls of the sheet metal member.

In the drawings:

Figure 1 is a longitudinal section through the hub; and

Fig. 2 is a sectional elevation thereof.

A is the pressed sheet metal member which is formed with a cylindrical portion B, an enlarged cylindrical portion C for forming the recess for the bearing and the outwardly-extending flange D. This blank may be pressed from sheet metal by a method forming no part of the present invention, and when complete the two cylindrical portions B and C are concentrically arranged and are united to each other by a flaring portion E. To provide the necessary thickness of wall for the portion B which is to engage the axle a reinforcing bushing F is placed therein. This bushing is formed with a tapering bore G for fitting the tapering shank of the axle and also with a splineway H. The thickness of the walls of this reinforcement is sufficient to provide the requisite strength with a spline of suitable dimensions for transmitting the torque. The torque must also be transmitted from this reinforcement member to the cylindrical portion B of the pressed sheet metal member, and as the walls are too thin for the cutting of a splineway therein, I have devised a construction of joint as follows:—The outer cylindrical surface of the member F is longitudinally serrated by a broaching operation so as to produce a series of teeth extending around the periphery. The inner cylindrical face of the portion B is also broached with corresponding serrations and such as to exactly fit upon the serrated face of the member F. The two members are then pressed together and the joint between is further strengthened by brazing so as to produce in effect an integral structure. The structure is then trued by mounting the member F upon a suitable mandrel and by taking a slight finishing cut over the portion C and flanged portion D.

What I claim as my invention is:—

1. A wheel hub, comprising a pressed sheet-metal member and a reinforcing bushing therefor, said members having complementary broached faces forming a multiplicity of longitudinally-extending interlocking serrations of slight depth relative to the thickness of the sheet-metal, said bushing and sheet-metal member being pressed into engagement with each other.

2. A wheel hub, comprising a pressed sheet-metal member of substantially uniform gage, forming concentric cylindrical portions of different diameters, and a reinforcing bushing for the portion of smaller diameter, said bushing and engaging portion being provided with complementary broached faces forming a multiplicity of longitudinally-extending interlocking serrations of slight depth relative to the thickness of the sheet-metal, said bushing and sheet-metal member being pressed into engagement with each other.

In testimony whereof I affix my signature in presence of two witnesses.

JOHN KELSEY.

Witnesses:
L. H. McCracken,
L. C. Brooks.